United States Patent [19]

Abe

[11] Patent Number: 4,755,931

[45] Date of Patent: Jul. 5, 1988

[54] VECTOR PROCESSING UNIT CAPABLE OF READING VECTOR DATA FROM A VECTOR REGISTER SIMULTANEOUSLY TO PLURAL RESOURCES

[75] Inventor: Hitoshi Abe, Hadano, Japan

[73] Assignee: Hitachi, Ltd., Tokyo, Japan

[21] Appl. No.: 685,117

[22] Filed: Dec. 21, 1984

[30] Foreign Application Priority Data

Dec. 26, 1983 [JP] Japan ............................. 58-243884

[51] Int. Cl.[4] .......................................... G06F 15/347
[52] U.S. Cl. ...................................... 364/200; 364/736
[58] Field of Search ... 364/200 MS File, 900 MS File, 364/736

[56] References Cited

U.S. PATENT DOCUMENTS

| | | | |
|---|---|---|---|
| 4,128,880 | 12/1978 | Cray, Jr. ............................. | 364/200 |
| 4,287,566 | 9/1981 | Culler ................................. | 364/754 |
| 4,302,818 | 11/1981 | Niemann ............................ | 364/736 |
| 4,400,768 | 8/1983 | Tomlinson ......................... | 364/200 |
| 4,435,765 | 3/1984 | Uchida et al. ..................... | 364/200 |
| 4,507,728 | 3/1985 | Sakamoto et al. ................. | 364/200 |
| 4,525,796 | 6/1985 | Omoda et al. ..................... | 364/730 |
| 4,636,942 | 1/1987 | Chen et al. ........................ | 364/200 |
| 4,661,900 | 4/1987 | Chen et al. ........................ | 364/200 |

FOREIGN PATENT DOCUMENTS 0085435  8/1983  European Pat. Off. .

OTHER PUBLICATIONS

Schmid, *Elektronik*, No. 2, "Multi-Mikroprozessor-Systeme", Jan. 29, 1982, pp. 87-95 (untranslated).

Primary Examiner—Gareth D. Shaw
Assistant Examiner—Christina M. Eakman
Attorney, Agent, or Firm—Antonelli, Terry & Wands

[57] ABSTRACT

In a vector processing unit, a vector register undergoing the first readout operation is simultaneously subjected to the second reading operation. The data obtained by the first readout operation and the data obtained by the second readout operation are respectively sent to separate resources executing different instructions.

5 Claims, 8 Drawing Sheets

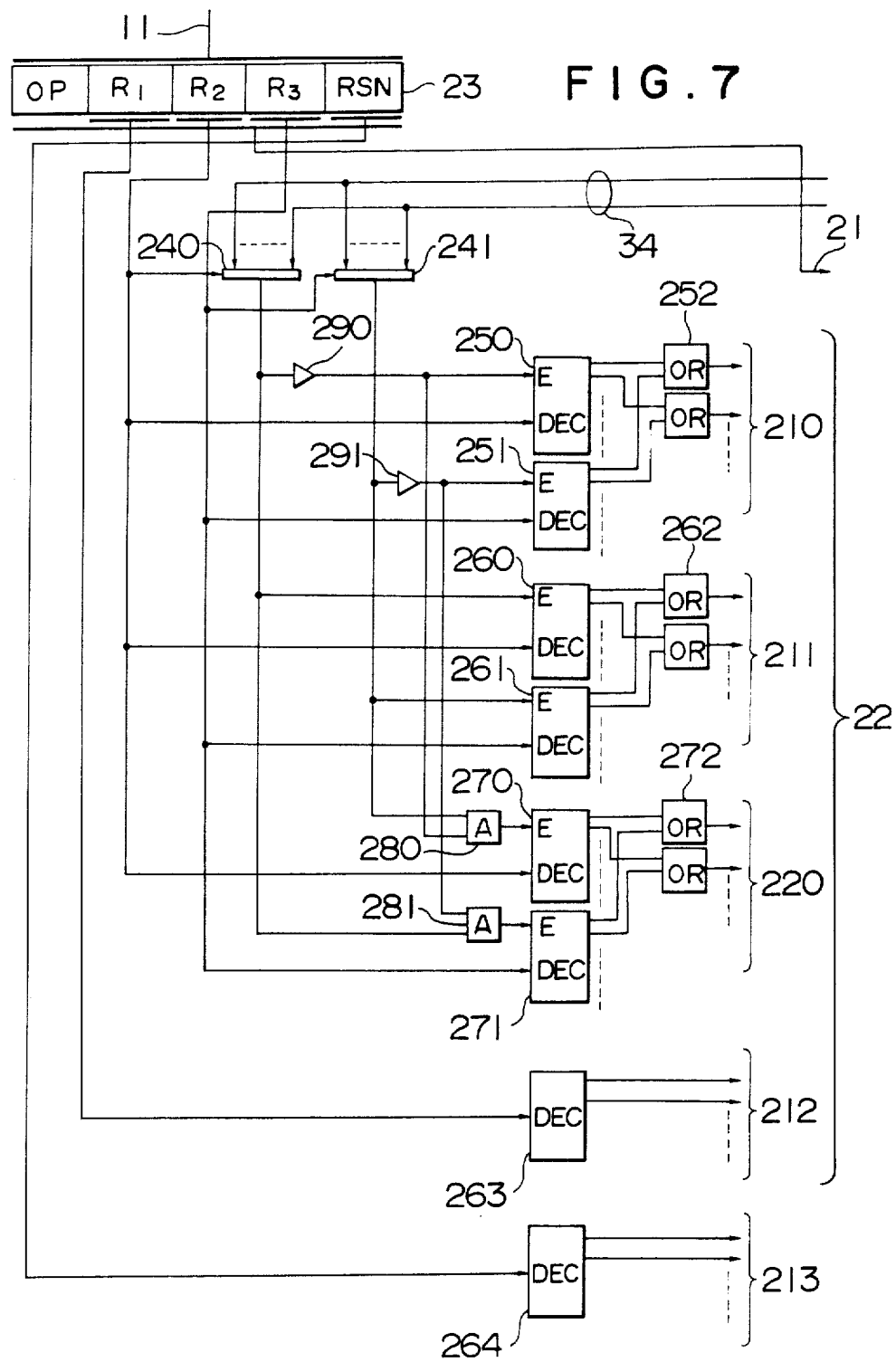

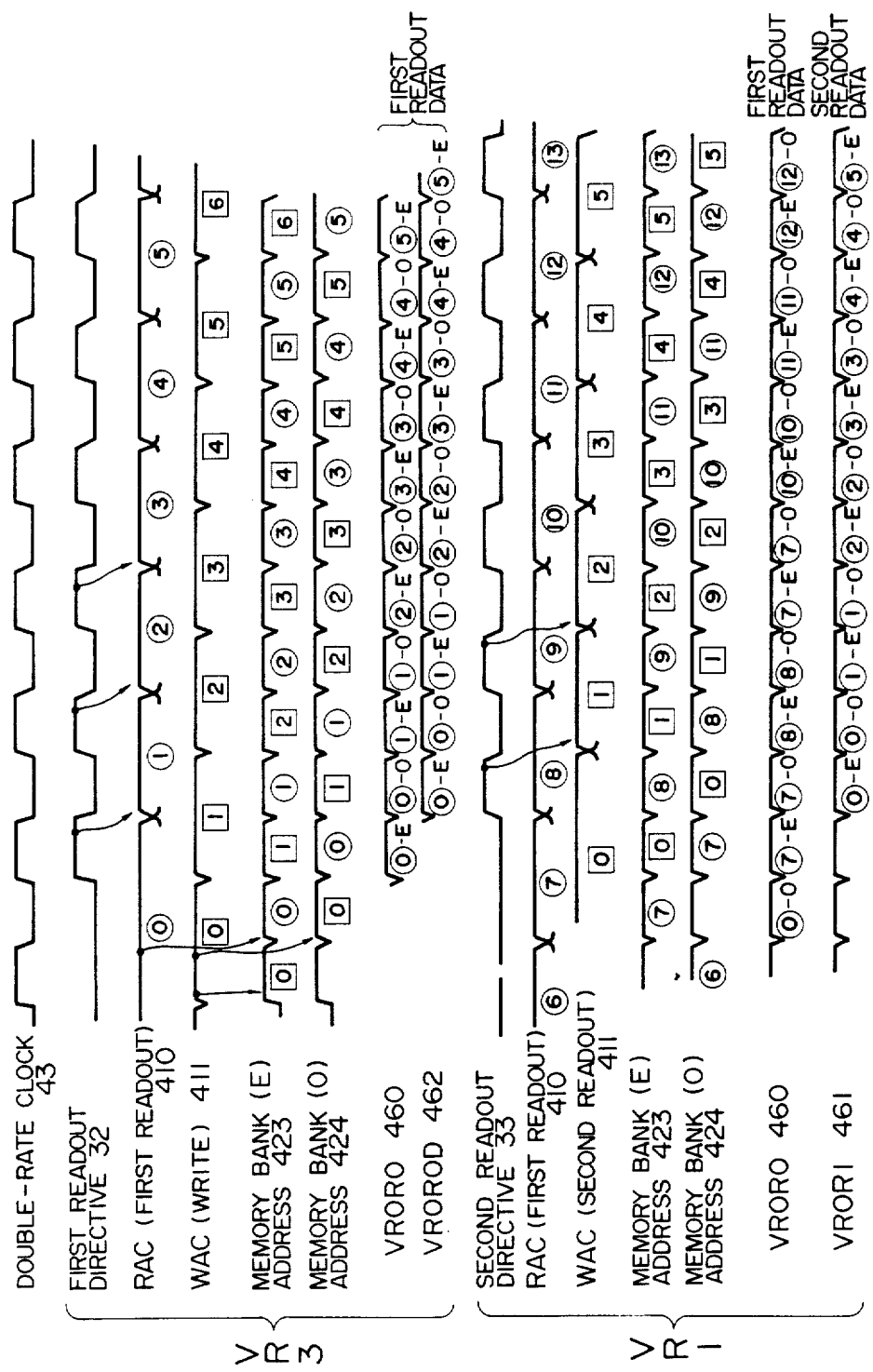

VECTOR PROCESSING UNIT CAPABLE OF READING VECTOR DATA FROM A VECTOR REGISTER SIMULTANEOUSLY TO PLURAL RESOURCES

CROSS-REFERENCE TO THE RELATED APPLICATIONS

This application relates to subject matter described in U.S. application Ser. No. 453,094 filed Dec. 27, 1982, now U.S. Pat. No. 4,617,625, entitled "VECTOR PROCESSOR" by Shigeo Nagashima, Hitoshi Abe and Yasuhiko Hatakeyama and assigned to the present assignee.

BACKGROUND OF THE INVENTION

The present invention relates to a vector processing unit.

For computing a large-sized matrix which frequently appears in the scientic calculation, a vector processing unit having a plurality of vector registers and a plurality of arithmetic and logic units (ALU's) was disclosed, for example, in a literature of Richard M. Russel, "The Cray-1 Computer System" in Communications of the ACM, January 1978, Vol. 21, No. 1, p.p. 63-72. In such a vector processing unit, the data stored in a vector register can be read out with one vector instruction while data is being written into the vector register with another vector instruction, and in such case, these two vector instructions are referred to as being chained.

In such a vector processing unit, one of the factors determining the vector processing time is the number of chains attained. The number of chains depends upon the conflict situation occurring between vector registers, between ALU's, and between memory requesters. An example of such a vector processing unit will now be described. In this example, the ALU has one adder, one multiplier and three memory requesters. Hereafter, the vector register is referred to as a VR and the ALU and the memory requester are referred to simply as resources.

EXAMPLE 1

$$Y^{(I)} = A^{(I)} + B^{(I)} + C^{(I)} (= 1, 2, \ldots L)$$

The time chart of this example is illustrated in FIG. 1. Since there is only one adder for two vector addition instructions, one vector addition instruction must wait until the other vector addition instruction has been completed. Accordingly, the vector addition is conducted in two chain groups. Assuming that each vector has L-elements, the processing time is represented as the sum of $(2 \times L)$ cycles and the overhead time.

EXAMPLE 2

$$Y^{(I)} = A^{(I)} + (B^{(I)} \times B^{(I)}) \ (I = 1, 2, \ldots L)$$

The time chart is illustrated in FIG. 2. The calculation is executed in one chain group. The execution time is approximately L cycles.

EXAMPLE 3

$$Y^{(I)} = (A^{(I)} + B^{(I)}) \times B^{(I)} (I = 1, 2, \ldots L)$$

The time chart is illustrated in FIG. 3. Since the calculation is executed in two chain groups, approximately $(2 \times L)$ cycles are required. Although the Example 3 includes two vector loading instructions, one vector adding instruction, one vector multiplying instruction, and one store instruction in the same way as the example 2, it takes twice as long as that of the example 2. The vector adding instruction and the vector multiplying instruction compete in reading data from the register VR1 in which the vector B has been loaded. Accordingly, the multiplication is kept waiting until the addition has been completed. Thus, calculation is carried out in two chain groups, resulting in the prolonged calculation time.

EXAMPLE 4:

$$Y^{(I)} = (A^{(I)} + B^{(I)}) \times B^{(I)} + B^{(I)} (= 1, 2, \ldots L)$$

The time chart is illustrated in FIG. 4. Since three chains are involved, it takes approximately $(3 \times L)$ cycles for the calculation to be executed. In the example 4, the addition of the vector B is added to the example 3. The vector multiplying instruction and the succeeding vector adding instruction compete in reading the register VR1. Despite the fact that the adder is free during the second chain group period, the adder cannot be started during that period.

As evident from the above description, in the vector processing unit of the prior art, it is impossible to read the data stored in one VR in parallel or concurrently for sending that data to a plurality of resources. In executing a program in which many vector instructions refer to the contents of a VR as described in the examples 3 and 4, therefore, two or more vector instructions compete in reading the contents of the VR. Since the start of the vector instruction is thus kept waiting, the chain is split into several fractions. As a result, the processing time is prolonged.

SUMMARY OF THE INVENTION

An object of the present invention is to eliminate the above described drawbacks of the prior art.

In accordance with the present invention, the VR undergoing a reading operation is further subjected to the second reading operation in parallel, and data obtained by the first reading operation and data obtained by the second reading operation are respectively sent to separate resources executing different vector instructions, where the second reading operation may include a plurality of operation series whose readout data is sent to respective resources executing different vector instruction.

BRIEF DESCRIPTION OF DRAWINGS

FIG. 7 shows the detailed configuration of a VR starting circuit included in FIG. 6.

FIG. 10 shows a time chart for illustrating the operation of the data unit.

DESCRIPTION OF THE PREFERRED EMBODIMENTS

Figure 1:
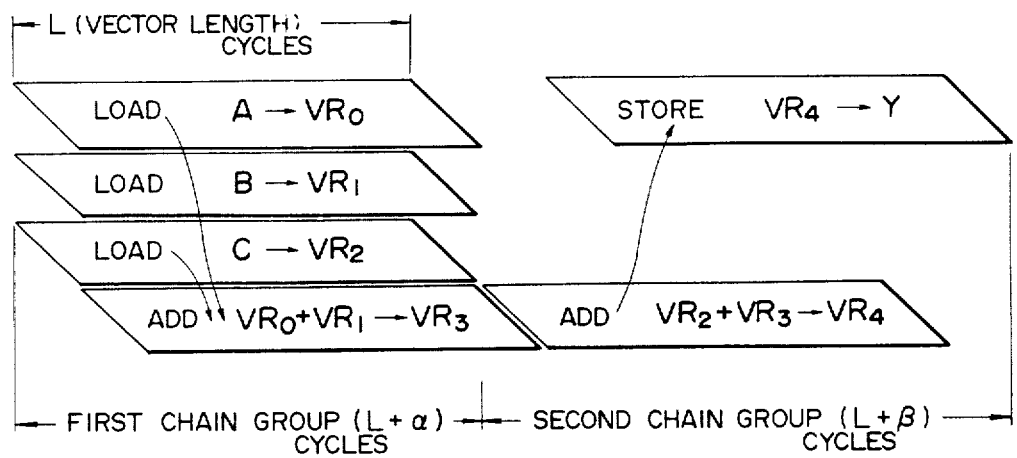
FIGS. 1 to 4 illustrate examples of the operation of the prior art.
Figure 2:
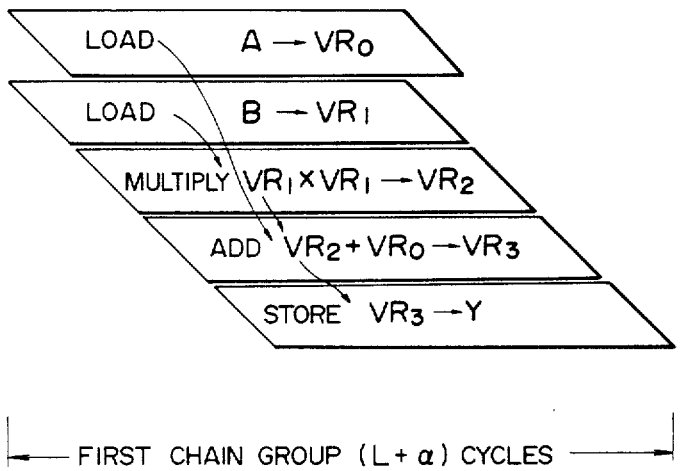
Figure 3:
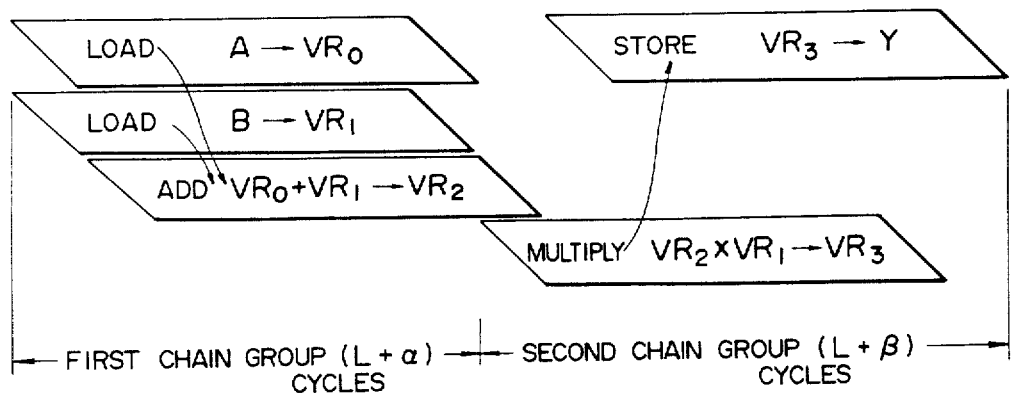

An embodiment of the present invention will now be described in detail by referring to the drawings.

Figure 5:
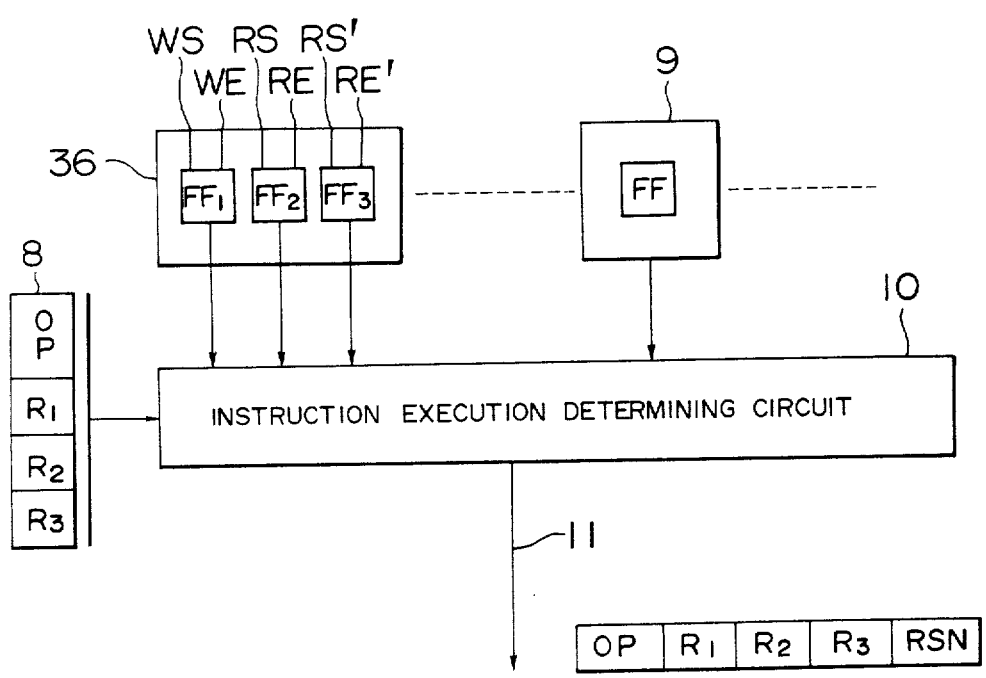
FIG. 5 shows the schematic configuration of an instruction execution determining section of a vector processing unit which is an embodiment of the present invention.

FIG. 5 shows the schematic configuration of an instruction execution determining section of a vector processing unit which is an embodiment of the present invention. Vector instructions read out of a main memory (which is not illustrated) are successively set into an instruction register 8. A sector OP stores an instruction code. Sectors $R_2$ and $R_3$ store VR numbers wherefrom two kinds of operands are to be read out. A sector $R_I$ stores the VR number in which the data loaded from the main memory by a memory requester or tne computed result fed from the ALU is to be written. Reference numeral 36 denotes a VR administration circuit provided for each VR. The VR administration circuit 36 functions to indicate which of the write state, the first read state, and the second read state is assumed by the corresponding VR. Each VR administration circuit 36 has three flip-flops (hereafter abbreviated as FF) designated as FF1, FF2 and FF3. The FF1, FF2 and FF3 correspond to the write state, the first readout state, and the second readout state, respectively. Signals applied to input terminals WS, RS and RS' set the FF1, FF2 and FF3, respectively. And signals applied to input terminals WE, RE and RE' reset the FF1, FF2 and FF3, respectively. Reference numeral 9 denotes a resource administration circuit provided for each resource. The resource administration circuit 9 functions to indicate whether the corresponding resource is being used or not. Each resource administration circuit 9 has one FF for indicating the resource is being used. Reference numeral 10 denotes an instruction execution determining circuit. Based upon signals fed from the VR administration circuit 36 and the resource administration circuit 9, the circuit 10 determines whether the VR and resource required for execution of the vector instruction stored in the instruction register 8 can be used or not. If the vector instruction can be executed, the instruction execution determining circuit 10 adds a number RSN of a resource (an arithmetic unit or a memory requester) to be activated to the vector instruction fed from the instruction register 8. The resultant signal is sent out on a signal line 11.

Figure 6:
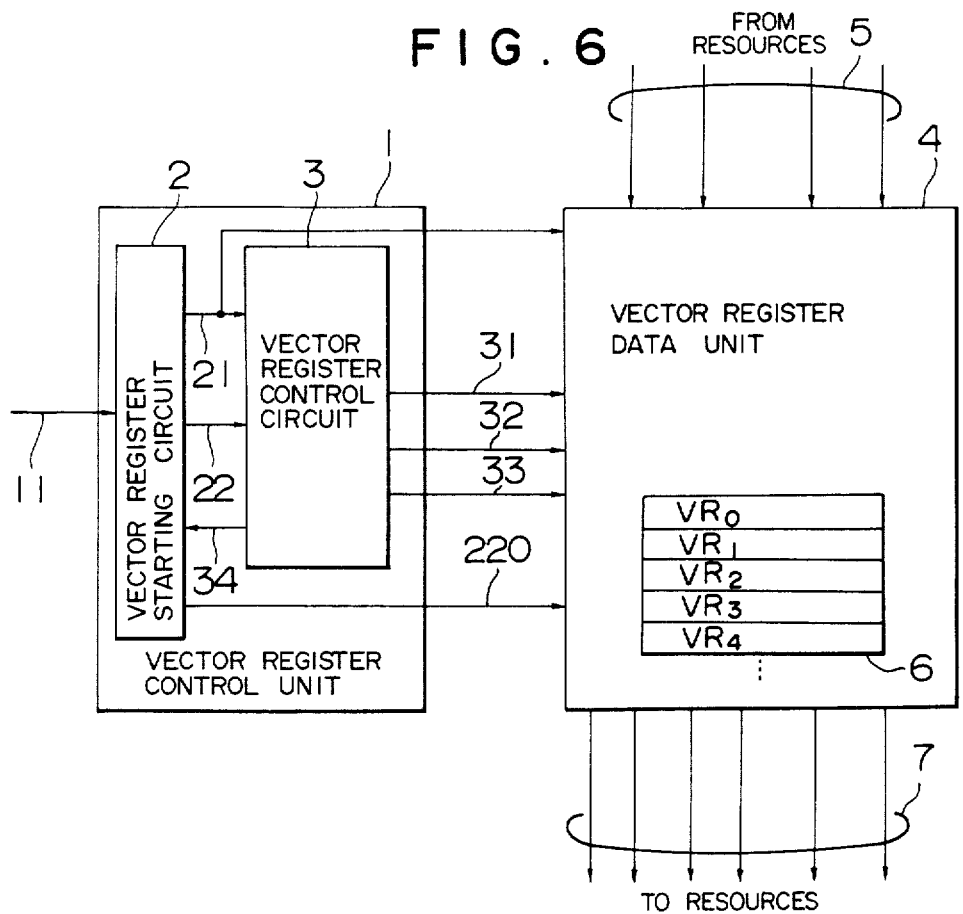
FIG. 6 shows the schematic configuration of a VR section of the vector processing unit which is an embodiment of the present invention.
Figure 11:
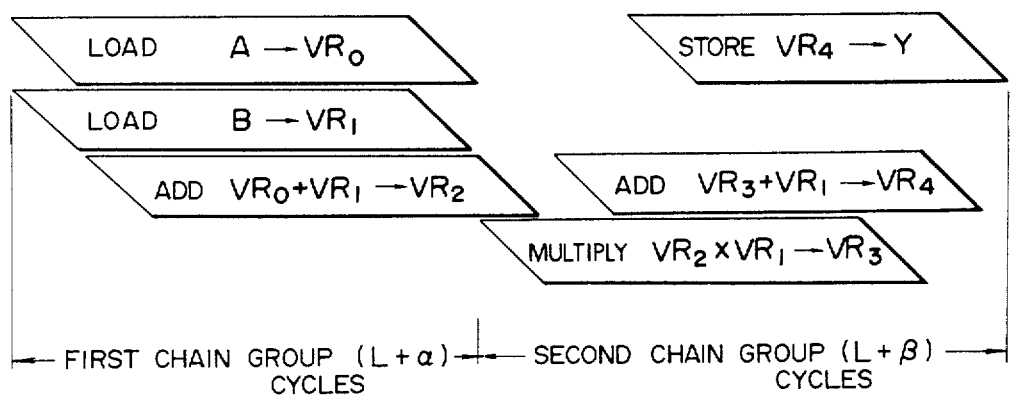
FIG. 11 shows the improvement of the present invention as compared with the example of FIG. 4.

FIG. 6 shows the schematic configuration of a VR section of the vector processing unit which is an embodiment of the present invention. Vector instructions which have been determined to be executable by the instruction execution determining section of FIG. 5 are successively supplied to a VR control unit 1 through the signal line 11.

In the VR control unit 1, a VR starting circuit 2 performs a necessary decoding operation to start a VR control circuit 3 via signal lines 21 and 22. In a writing operation, a VR data unit 4 writes data supplied from signal lines 5 which are separately provided for respective resources into a VR 6 in accordance with a write directive signal 31 fed from the VR control circuit 3. In the first reading operation, the VR data unit 4 reads the contents of the VR 6 to send them out as operand data 7 in accordance with a first readout directive signal 32 supplied from the VR control circuit 3. In the second reading operation, the VR data unit 4 reads the contents of the VR 6 to send them out as the operand data 7 in accordance with a second readout directive signal 33 supplied from the VR control circuit 3.

Detailed configuration of the VR starting circuit 2, VR control circuit 3, and VR data unit 4 will now be described by referring to FIGS. 7 to 9.

FIG. 7 shows the configuration of the VR starting circuit 2. An instruction register 23 receives a vector instruction from the instruction execution determining section of FIG. 5 through the signal line 11. The first readout state signal for indicating that each VR is placed in the first readout state is transmitted on signal lines 34. And it is detected via selection circuits 240 and 241 whether the VR which is to read two kinds of operands is in the first readout state or not. When the VR designated by the sector R2 is not in the first readout state, for example, a decoding circuit 250 is enabled via an inverter 290. Among the first readout starting signal lines 210 of the VR, a signal line corresponding to the R2 sector turns "1". For the sector R3, a decoding circuit 251 and an inverter 291 are provided in the same way as for sector R2. When the VR designated by the sector R2 is in the first readout state, a decoding circuit 260 is enabled. Among the second readout starting signal lines 211, a signal line corresponding to the decoding result of sector R2 turns to "1". For sector R3, a decoding circuit 261 is provided in the same way.

An operand data synchronizing signal sent to the VR data unit 4 through signal lines 220 directs data synchronization when one of two kinds of operands is in the first readout state and the other becomes the second readout state. When the VR of sector R2 is in the first readout state and the VR of sector R3 is not in the first readout state, for example, a decoding circuit 271 is enabled to send "1" on a line which is included in operand data synchronizing signal lines 220 and which corresponds to the VR of sector R2. When the VR of sector R2 is not in the first readout state and the VR of sector R3 is in the first readout state, a decoding circuit 270 sends the signal "1" on a line included in the operand data synchronizing signal lines 220, which corresponds to the VR of sector R3. If both the VR of sector R2 and the VR of sector R3 are in the first readout state or if both of them are not in the first readout state, the operand data synchronizing signal is not sent out.

A decoding circuit 263 decodes sector R1 to start a VR in which the data loaded from the main memory or the calculation result fed from the arithmetic unit is to be written. The output of the decoding circuit 263 is sent out as "1" on one of the VR write starting signal lines 212, which corresponds to sector R2. And a decoding circuit 264 decodes the RSN to start a resource which executes the instruction. The output of the decoding circuit is sent out as "1" on one of resource starting signal lines 213, which corresponds to the RSN.

In FIG. 7, the VR write starting signal lines 212, the resource starting signal lines 213, and the decoding circuits 263 and 264 are conventionally provided. It is to be noted that the decoding circuits 250, 251, 260, 261, 270, 271 and selecting circuits 240 and 241, which are associated with R2 and R3, realizes the present invention.

Figure 8:
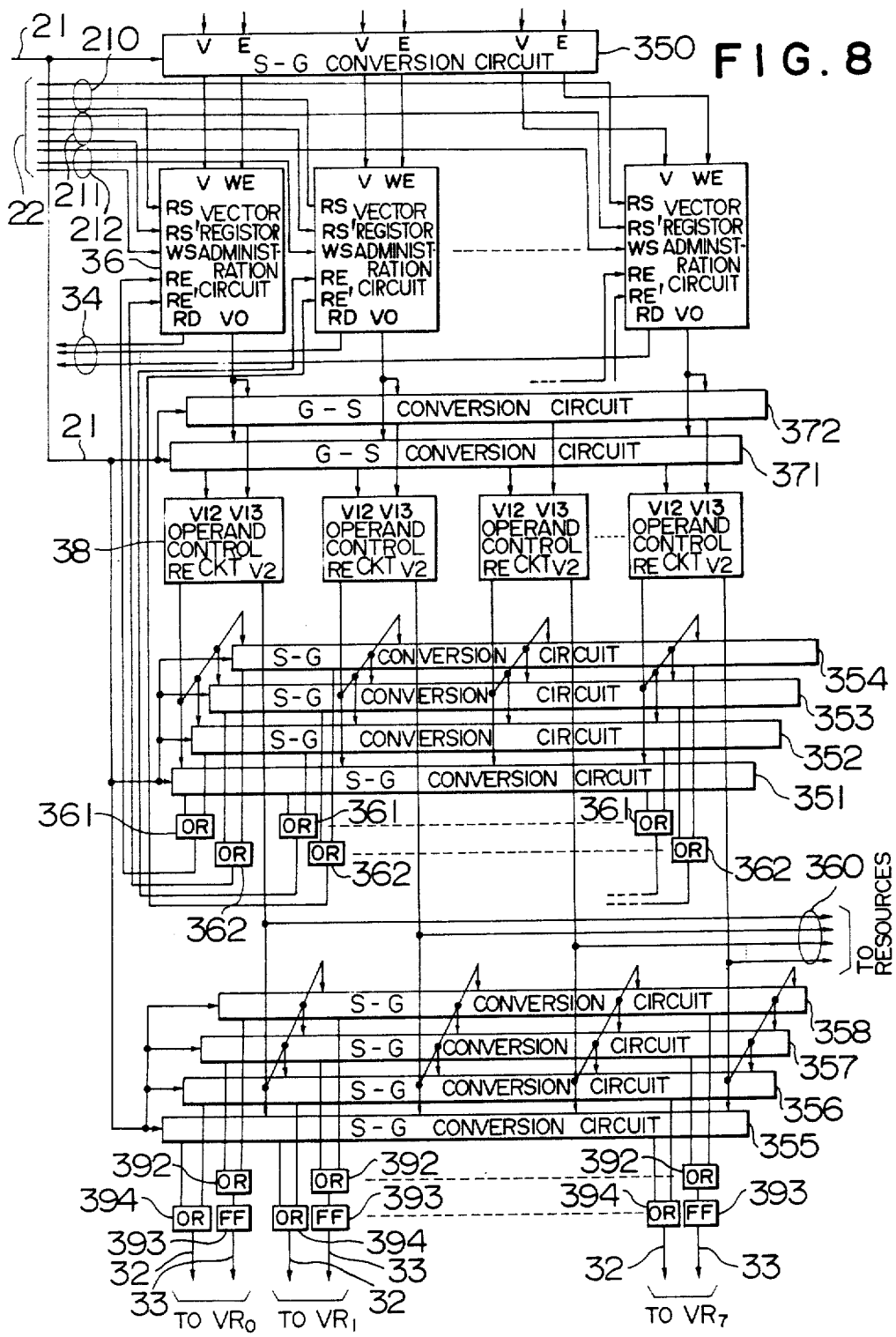
FIG. 8 shows the detailed configuration of a VR control circuit included in FIG. 6.

FIG. 8 shows the configuration of the VR control circuit 3. If the signal "1" is sent on one of the first readout starting signal lines 210, it is given to an input terminal RS of the corresponding VR administration circuit 36. And the first readout state indicating flip-flop FF2 included in the circuit 36 is set. If the signal "1" is sent on one of the second readout starting signal lines 211, it is given to an input terminal RS' of the corresponding VR administration circuit 36, and the second readout state indicating flip-flop FF3 included in the circuit 36 is set. If the signal "1" is sent on one of the write starting signal lines 212, it is given to an input terminal WS' of the corresponding VR administration circuit 36, and. And the write state indicating flip-flop FF1 included in the circuit 36 is set. The output of the second readout state indicating FF3 included in each VR administration circuit 36 is sent from the output terminal RD thereof to the VR starting circuit 2 via a signal line 34.

Reference numeral 350 denotes a resource-register (hereafter abbreviated as S-G) conversion circuit. The circuit 350 supplies a set composed of a write directive signal fed to an input terminal V thereof and a write completion signal fed to an input terminal E thereof to input terminals V and WE of the VR administration circuit corresponding to the VR to which the resource data is to be supplied. The S-G conversion circuit 350 controls the above described operation on the basis of the instruction information received from the instruction register 23 via the signal line 21.

The write directive signal is sent from the resource in synchronism with outputting of the data (vector element) one by one from the resource. Each time the VR administration circuit 36 receives the write directive signal, it updates a pointer thereof. The write completion signal is issued when the resource has processed all of the elements (vector elements) to be processed by one vector instruction. Upon receiving the write completion signal, the VR administration circuit 36 resets the write state FF1 included therein. And the VR administration circuit 36 sends out readout permission signals from the output terminal $V_0$ as many times as indicated by the pointer. And the VR administration circuit 36 puts back the pointer by the number of readout permission signals sent out.

An operand control circuit 38 is provided in correspondance to respective resource. When the corresponding resource receives data, the operand control circuit 38 receives the readout permission signal from a VR administration circuit 36 corresponding to the VR supplying the data. Therefore, the operand control circuit 38 corresponding to the arithmetic unit receives the readout permission signals fed from separate VR administration circuits 36 respectively at the input terminals V12 and V13. However, the operand control circuit corresponding to the memory requester for storing the VR data into the main memory receives only the readout permission signal from one VR administration circuit 36 at the input terminal V12.

Reference numeral 371 denotes a register-resource (hereafter abbreviated as G-S) conversion circuit. When the VR corresponding to the VR administration circuit 36 sends out the readout permission signal fed from that VR administration circuit as the VR designated by the sector R2 of the instruction, the G-S conversion circuit 371 gives the signal to the input terminal V12 of the operand control circuit corresponding to the destination resource. Reference numeral 372 also denotes a G-S conversion circuit. When the VR corresponding to the VR administration circuit 36 sends out the readout permission signal fed from that VR administration circuit as the VR designated by the sector R3 of the instruction, the G-S conversion circuit 372 gives the signal to the input terminal V13 of the operand control circuit corresponding to the destination resource. Both of the G-S conversion circuits 371 and 372 control the above described operation on the basis of the instruction information supplied from the instruction register 23 through the signal line 21.

The operand control circuit 38 compares the readout permission signal applied to the input terminal V12 thereof with that applied to the input terminal V13 to determine a signal count common to both the readout permission signals, and sends out the readout directive signals from the output terminal V2 thereof for each cycle respectively by a number of times equal to the count thus determined. On the basis of the readout permission signals applied to the input terminal V12, the operand control circuit 38 sends out the readout directive signals at the output terminal V2 for respective cycles as many times as the applied readout permission signals i.e., by a number of times equal to the number of the input permission signals.

Reference numberal 355 denotes an S-G conversion circuit. The circuit 355 sends the readout directive signal from the operand control circuit 38 to a VR. The resource corresponding to the operand control circuit 38 receives data in the first readout state from the just described VR designated by the sector $R_2$ of the instruction. Numeral 356 also denotes an S-G conversion circuit. In the foregoing description, sector $R_2$ must be replaced by sector $R_3$ for the S-G conversion circuit 356. Reference numeral 357 also denotes an S-G conversion circuit. The circuit 357 sends the readout directive signal from the operand control circuit 38 to a VR. The resource corresponding to the operand control circuit 38 receives data in the second readout state from the just described VR designated by the sector $R_2$ of the instruction. Numeral 358 also denotes an S-G conversion circuit. In the foregoing description, sector $R_2$ must be replaced by sector $R_3$ for the S-G conversion circuit 358.

The readout directive signal lines fed from the S-G conversion circuits 355 and 356 having the same destination VR are respectively coupled to OR gates 394 to produce the first readout directive signal 32. The readout directive signal lines fed from the S-G conversion circuits 357 and 358 having the same destination VR are respectively coupled to OR gates 392. The output of the OR gate 392 is delayed by one cycle in a FF 393 for time alignment. As a result, the second readout directive signal 33 is produced.

The readout directive signal from each operand control circuit 38 is sent to the corresponding resource through one of signal lines 360. On the basis of the readout directive signal, each resource detects that the data is read out of the VR after a predetermined time has elapsed and waits for the data from that VR.

Each operand control circuit 38 retains the number of elements (vector elements) to be processed by one vector instruction. After as many readout permission signals as the number of elements have been sent out, the operand control circuit 38 sends out the readout completion signal at the output terminal RE.

Reference numeral 351 denotes an S-G conversion circuit. The circuit 351 sends the readout completion signal from the operand control circuit 38 to a VR administration circuit 36 corresponding to a VR. The resource corresponding to the operand control circuit 38 receives data in the first readout state from the just described VR designated by the sector $R_2$ of the instruction. Numeral 352 also denotes an S-G conversion circuit. In the foregoing description, sector $R_2$ must be replaced sector $R_3$ for the S-G conversion circuit 352. Reference numeral 353 also denotes an S-G conversion circuit. The circuit 353 sends the readout completion signal from the operand control circuit 38 to a VR administration circuit 36 corresponding to a VR. The resource corresponding to the operand control circuit 38 receives data in the second readout state from the just described VR designated by the sector $R_2$ of the instruction. Numeral 354 also denotes an S-G conversion circuit. In the sector foregoing description, $R_2$ must be replaced by sector $R_3$ for the S-G conversion circuit 354.

The readout completion signal lines fed from the S-G conversion circuits 351 and 352 corresponding to the same VR are respectively coupled to OR gates 361. The output of the OR gate 361 is applied to the input terminal RE of the corresponding VR administration circuit 36. And the readout completion signal lines fed from the S-G conversion circuit 353 and 354 corresponding to the same VR are respectively coupled to OR gates 362. The output of the OR gate 362 is applied to the input terminal RE' of the corresponding VR administration circuit 36. Each VR administration circuit 36 resets the first readout state flip-flop FF2 when it has received the readout completion signal at the input terminal RE. And each VR administration circuit 36 resets the second readout state flip-flop FF3 when it has received the readout completion signal at the input terminal RE'.

For attaining the present invention in the VR control circuit 3, the second readout state flip-flop FF3 is provided in the VR administration circuit 36 and the S-G conversion circuits 353, 354, 357 and 358 are provided.

Figure 9:
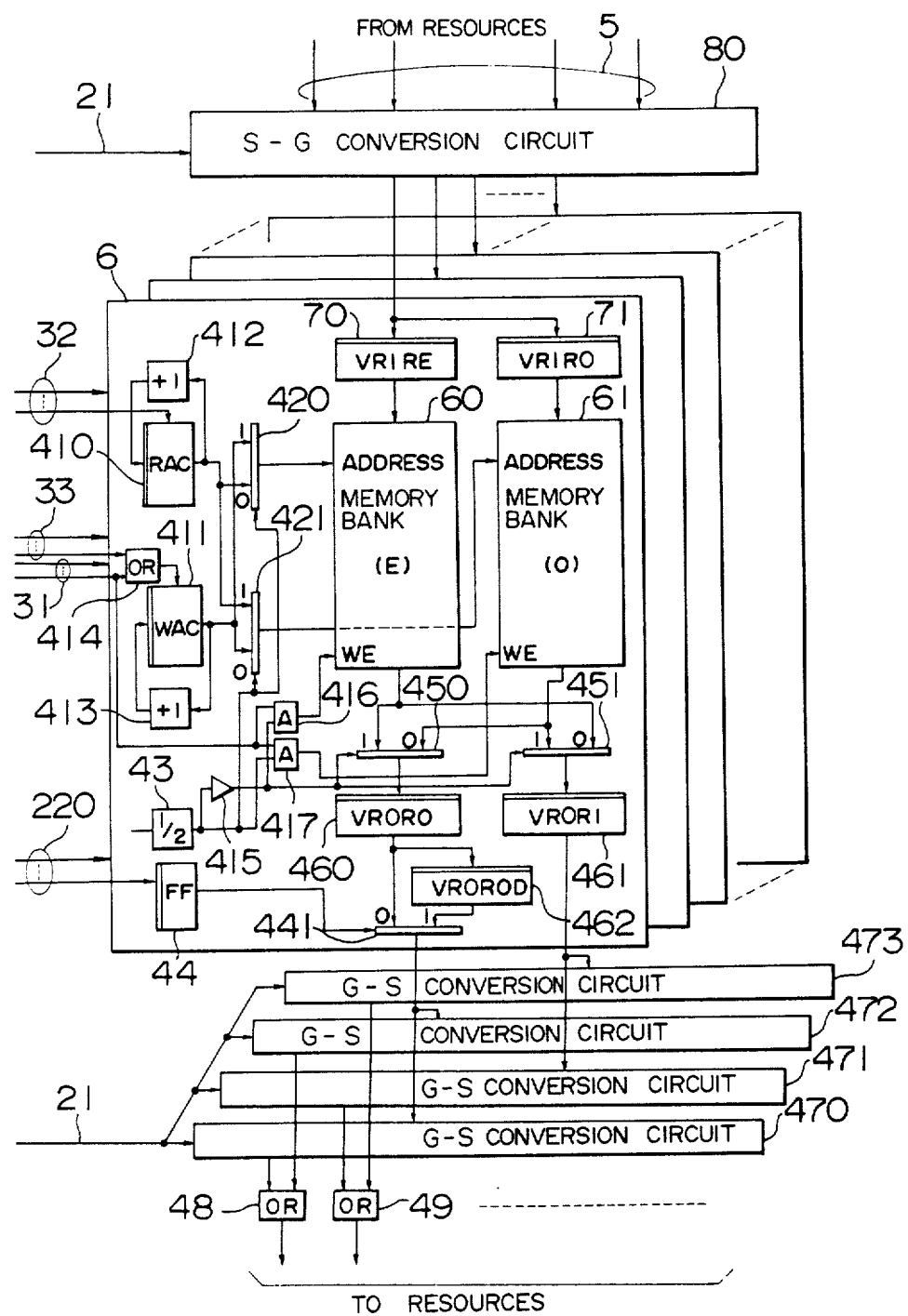
FIG. 9 shows the detailed configuration of a VR data unit included in FIG. 6.

FIG. 9 shows the configuration of the VR data unit. In a VR 6, a readout address register (RAC) 410 retains the readout address in the first readout state. And the address is updated by the first readout directive signal 32 fed from the VR control circuit 3. Reference numeral 412 denotes an increment circuit for increasing the address by 1. A write address register (WAC) 411 retains the write address in writing operation. The write address is updated by the write directive signal 31, or the write address register retains the readout address in the second readout state. At this time, the readout address is updated by the second readout directive signal 33. Reference numeral 413 denotes an increment-by-one circuit for updating the address. The write directive signal 31 fed from the VR control circuit 3 and the second readout directive signal 33 are ORed by an OR circuit 414. The value of the RAC 410 and the value of the WAC 411 are alternately selected by address selectors 420 and 421 for each cycle. The values thus selected are given to two memory banks 60 and 61 respectively composed of RAM's. The data read out of these memory banks 60 and 61 is alternately switched by data selectors 450 and 451 to be applied to readout data registers 460 and 461. The data obtained by the first readout operation is stored in the readout data register 460. The data obtained by the second readout operation is stored in the readout data register 461. In the write operation, however, the data supplied to the readout data register 461 has no meaning.

A data selector 441 selects either the output of the readout data register 460 wherein the data obtained by the first readout operation is stored or the output of a register 462. The register 462 is provided to delay the data obtained by the first readout operation by one cycle. The selection of the inputs in the data selector 441 is controlled by the output of the FF 44. The FF 44 is set by the operand data synchronizing signal fed from the VR starting circuit 2 through one of signal lines 220.

A double-rate clock circuit 43 generates clocks at twice the rate of one cycle. The address selectors 420 and 421 are directly controlled by the output of the double-rate clock circuit 43. And the data selectors 450 and 451 are controlled by the output of an inverter 415 which in turn is coupled to the output of the double-rate clock circuit. AND gates 416 and 417 supply the write directive signal 31 fed from the VR control circuit 3 respectively to the memory banks 60 and 61 in synchronism with the output of the double-rate clock circuit 43. Data to be written into the memory banks 60 and 61 is stored in write data registers 70 and 71, respectively. The data stored in the write data registers 70 and 71 are respectively written into the memory banks 60 and 61 when the write directive signal is supplied from the AND gates 416 and 417.

In the VR 6 configured as described above, the memory bank 60 assumes the first readout state and the memory bank 61 assumes the write state or the second readout state when the output of the double-rate clock circuit 43 is "0". When the output of the circuit is "1", the states of the memory banks 60 and 61 are interchanged with each other.

An S-G conversion circuit 80 supplies data fed from respective resources through separate signal lines 5 to the destination VR. The S-G conversion circuit 80 is controlled by the instruction information supplied from the instruction register 23 through the signal 21.

When the data from the data selector 441, i.e., the data obtained by the first reading operation is to be sent by the VR 6 as the VR designated by the sector $R_2$ of the instruction, a G-S conversion circuit 470 supplies the data to the destination resource. When the data from the readout data register 461, i.e., the data obtained by the second readout operation is to be sent by the VR 6 as the VR designated by the sector $R_2$ of the instruction, a G-S conversion circuit 471 supplies the data to the destination resource. When the data from the readout data register 460, i.e., the data obtained by the first readout operation is to be sent by the VR 6 as the VR designated by the sector R3 of the instruction, a G-S conversion circuit 472 supplies the data to the destination resource. When the data from the readout data register 461, i.e., the data obtained by the second readout operation is to be sent by the VR 6 as the VR designated by the R3 of the instruction, a G-S conversion circuit 473 supplies the data to the destination resource. The G-S conversion circuits 470 to 473 are controlled by the instruction information supplied from the instruction register 23 through the signal line 21.

Data output lines of the G-S conversion circuits 470 and 472 having the same destination resource are coupled to OR gates 48. And data output lines of the G-S conversion circuits 471 and 473 having the same resource are coupled to OR gates 49.

Figure 4:
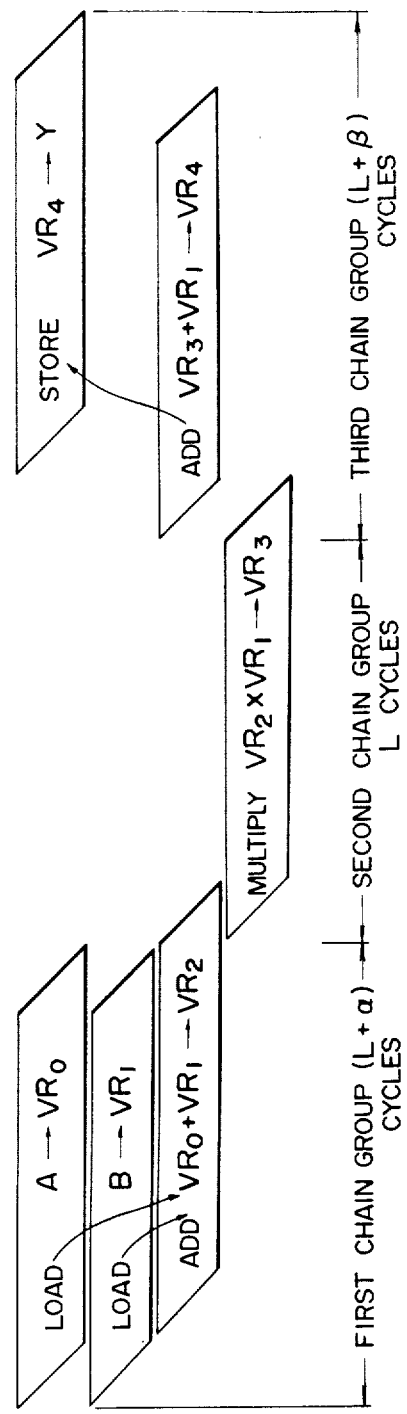

The operation of the embodiment as a whole will now be described. It is now assumed that a vector adding instruction has been started so that sector R1, R2, R3, and a designation of RSN will be VR4, VR3, VR1, and one of arithmetic units. In addition, it is assumed that the multiplication result is being written into VR3 and the data stored in VR1 is being subjected to the first readout operation to the multiplier. That is to say, it is assumed that the multiplication instruction has just started in the second chain group of FIG. 4.

In the VR starting circuit 2, the first readout state signals supplied from the VR administration circuits 36 of the VR3 and VR1 onto signal lines 34 are then "0" and "1", respectively. Therefore, the output of the selection circuit 240 turns to "0" and the output of the selection circuit 241 turns to "1". Thus, the decoding circuit 250 is enabled. Accordingly, a signal line included in the first readout starting signal lines 210, corresponding to the VR3 is changed to "1". In addition, the decoding circuit 261 is enabled to change the signal line included in the second readout starting signal lines 211, corresponding to the VR3 to "1". Thereby, the VR administration circuit 36 of the VR3 assumes the first readout state (chain) in the write state, and the VR administration circuit 36 of the VR1 assumes the first readout state the second readout state.

On the other hand, in the VR starting circuit 2, the decoding circuit 270 is enabled. And the operand data synchronizing signal is supplied to one of the signal lines 220 corresponding to the VR3. The FF 44 in the VR3 is set to "1". Thus, the data selection circuit 441 in the VR3 selects the output of the data register 462.

By the instruction information supplied from the VR starting circuit 2 to the VR control unit 3 through the signal line 21, the G-S conversion circuit 371 newly establishes a path for supplying the readout permission signal from the VR administration circuit 36 corresponding to the VR3 to the input terminal V12 of the operand control circuit 38 corresponding to the above described adder, and the G-S conversion circuit 372 newly establishes a path for supplying the readout permission signal from the VR administration circuit 36 corresponding to the VR1 to the input terminal V13 of the operand control circuit 38. Further, the S-G conversion circuit 355 newly establishes a path for supplying the readout directive signal from the above described operand control circuit 38 to the VR3, and the S-G conversion circuit 358 newly establishes a path for supplying the readout directive signal from the above described operand control circuit 38 to the VR1. The S-G conversion circuit 351 newly establishes a path for supplying the readout completion signal from the above described operand control circuit 38 to the VTR administration circuit 36 corresponding to the VR3. The S-G conversion circuit 354 newly establishes a path for supplying the readout completion signal to the VR administration circuit 36 corresponding to the VR1.

By the instruction information supplied from the VR starting circuit 2 to the VR data unit 4 through the signal line 21, the G-S conversion circuit 470 newly establishes a path for supplying the data from the VR3 (the data obtained by the first readout operation) to the adder. The G-S conversion circuit 473 newly establishes a path for supplying the data from the VR1 to the above described adder, and the S-G conversion circuit 80 newly establishes a path for supplying the data (calculation result) from the above described adder to the VR4.

FIG. 10 shows the time chart of the operation of the VR data unit 4 when the above described adding instruction is executed. In FIG. 10, the registers 460, 461 and 462 are provided with E or O to indicate that the data read out of the memory bank 60 or 61 is stored in the register. And figures enclosed in symbols O and □ represent values indicated by the RAC 410 and WAC 411, respectively.

In the above described operation, the VR1 can be subjected to two routes of readout operation. Accordingly, the multiplying instruction and the succeeding adding instruction can be chained. As a result, three chain groups of the prior art can be reduced to two chain groups in total.

The embodiment of the present invention has heretofore been described with respect to one series of readout operations to the VR's. According to the present invention, one VR is subjected to the first readout operation and the second readout operation. This data thus read out can be sent to respective resources which execute separate vector instructions, respectively. Accordingly, it becomes possible to reduce the number of chain groups and operate the resource efficiently. As a result, the vector processing time can be reduced.

I claim:

1. A vector processing unit, comprising:
    vector register means including a plurality of vector registers operable independently from each other for storing vector data;
    a plurality of resources;
    vector register control means responsive to vector instructions for controlling connections between vector registers designated by said instructions and said resources and for controlling reading/writing of the vector registers to effect data transfer between each vector register and each resource;
    each vector register comprising a plurality of memory banks operating independently of each other, at least first and second address counter means for generating sequential memory bank addresses to access said memory banks for reading and writing of data, respectively, means for permitting said second addrss counter means to operate for reading of data under control of said vector register control means, and read control means responsive to said vector register control means for sequentially providing addresses alternately from the respective first and second address counter means to respective ones of said plurality of memory banks to read vector data from at least two memory banks simultaneously; and
    transfer means responsive to said vector instructions for transferring respective data read simultaneously from respective memory banks of the vector register to different ones of said resources.

2. A vector processing unit according to claim 1, wherein each vector register further comprises an equal number of memory banks and corresponding number of address counter means; wherein said vector register control means includes synchronizing signal generating means responsive to said vector instructions for controlling said read control means of all the vector registers to operate with the same timing so that the respective address counter means among the vector registers address respective memory banks in synchronism; and wherein each vector register further includes delay means responsive to said synchronizing signal generating means for delaying the data output of one of two vector registers designated by one instruction so that data read from the same banks of the two vector registers may be outputted with the same timing when different ones of said respective address counter means in the two vector registers are enabled.

3. A vector processing unit according to claim 1, wherein said vector register control means includes directive signal generating means responsive to said vector instructions for applying write directive signals to one of said first and second address counter means of a selected vector register in response to a vector instruction designating a vector write operation for said selected vector register and for applying read directive signals to the other one or both of said first and second address counter means of a selected vector register in response to one or more vector instructions designating a read operation for said selected vector register, said first and second address counter means generating sequential memory bank addresses in response to receipt of said read and write directive signals.

4. A vector processing unit according to claim 3, wherein said directive signal generating means includes administration means for providing status information indicating whether a vector regiestor is in the process of a single read operation or plural simultaneous read operations, and said vector register control means further includes means responsive to successive vector instructions and said administration means for controlling said administration means to update said status information.

5. A vector processing unit according to claim 3, wherein each vector register further includes write control means responsive to applicaiton of a write directive signal from said directive signal generating means to said one of said first and second address counter means for generating a write enable signal and for applying said write enable signal in synchronism with the application of said memory bank addresses from said one of said first and second address counter means alternately to said memory banks, so that when write directive signals are supplied to said one of said first and second address counters a write operation is effected on the basis of the generated memory bank addresses, and when read directive signals are supplied to said one of said first and second address counters a read operation is effected on the basis of the generated memory bank addresses.

* * * * *